US008234393B2

(12) United States Patent
Schneider

(10) Patent No.: US 8,234,393 B2
(45) Date of Patent: Jul. 31, 2012

(54) GENERIC NETWORK PROTOCOL SCRIPTING

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 796 days.

(21) Appl. No.: 11/985,670

(22) Filed: Nov. 16, 2007

(65) Prior Publication Data

US 2009/0132723 A1    May 21, 2009

(51) Int. Cl.
G06F 15/16    (2006.01)

(52) U.S. Cl. .................................. 709/230

(58) Field of Classification Search .................. 709/230
See application file for complete search history.

(56) References Cited

U.S. PATENT DOCUMENTS

| | | | |
|---|---|---|---|
| 5,737,517 A * | 4/1998 | Kite et al. ........................ 714/38 |
| 5,838,919 A * | 11/1998 | Schwaller et al. ............. 709/224 |
| 6,189,031 B1 * | 2/2001 | Badger et al. .................. 709/224 |
| 6,920,502 B2 | 7/2005 | Araujo |
| 6,963,996 B2 | 11/2005 | Coughlin |
| 6,981,041 B2 | 12/2005 | Araujo |
| 7,043,546 B2 | 5/2006 | Smith et al. |
| 7,065,549 B2 * | 6/2006 | Sun et al. ....................... 709/229 |
| 7,111,060 B2 | 9/2006 | Araujo |
| 7,269,633 B2 | 9/2007 | Allan |
| 7,349,867 B2 | 3/2008 | Rollins et al. |
| 7,392,321 B1 | 6/2008 | Wolf et al. |
| 7,415,429 B2 | 8/2008 | Rollins et al. |
| 7,481,361 B2 | 1/2009 | Dickerson et al. |
| 7,519,702 B1 | 4/2009 | Allan |
| 2004/0059809 A1 * | 3/2004 | Benedikt et al. ............... 709/224 |
| 2004/0143931 A1 | 7/2004 | Dennis |
| 2004/0225999 A1 * | 11/2004 | Nuss .............................. 717/114 |
| 2004/0267820 A1 | 12/2004 | Boss et al. |
| 2006/0005079 A1 * | 1/2006 | Kaplan et al. .................... 714/38 |
| 2006/0085537 A1 | 4/2006 | Dickerson et al. |
| 2007/0050844 A1 | 3/2007 | Lebel |
| 2007/0069005 A1 | 3/2007 | Dickerson et al. |
| 2008/0065702 A1 | 3/2008 | Dickerson et al. |
| 2008/0133210 A1 | 6/2008 | Chagoly et al. |
| 2009/0095807 A1 | 4/2009 | Dickerson et al. |

OTHER PUBLICATIONS

Tsai, W.T.; Paul, R.; Cao, Z.; Yu, L.; Saimi, A.; , "Verification of Web services using an enhanced UDDI server," Object-Oriented Real-Time Dependable Systems, 2003. (WORDS 2003). Proceedings of the Eighth International Workshop on , vol., No., pp. 131-138, Jan. 15-17, 2003.*
Hypertext Transfer Protocol—HTTP/1.1, The Secure Hypertext Transfer Protocol. Jun. 1999, 114 pages.
HMAC: Keyed-Hashing for Message Athentication. Feb. 1997. 11 pages.
HTTP Over TLS. May 2000. 7 pages.
The Transport Layer Security (TLS) Protocol Version 1.1, Apr. 2006. 82 pages.
HTTP Authentication: Basic and Digest Access Authentication. Jun. 1999. 32 pages.

(Continued)

Primary Examiner — Ajay Bhatia
(74) Attorney, Agent, or Firm — Lowenstein Sandler PC

(57) ABSTRACT

Some embodiments of generic network protocol scripting have been presented. In one embodiment, a script is received from a user. The script is associated with a set of connection oriented network transport based network protocols. The script may be executed to emulate a network transaction according to one of the set of connection oriented network transport based network protocols within a network.

20 Claims, 4 Drawing Sheets

OTHER PUBLICATIONS

Hypertext Transfer Protocol (HTTP) Digest Authentication Using Authentication and Key Agreement (AKA) Version-2. Nov. 2005. 13 pages.

http://jakarta.apache.org/jmeter/. Feb. 23, 2007. 2 pages.

http://www.aepnetworks.com/ AEP Netilla Security Platform (NSP). 2007. 2 pages.

http://httpd.apache.org/docs/2.0/. Apr. 24, 2007. 192 pages.

The Advanced Encryption Standard-Cipher-based Message Authentication Code-Pseudo-Random Function-128. Aug. 2006. 7 pages.

Simple Network Management Protocol from Wikipedia http://en.wikipedia.org/wiki/SMNP. Oct. 31, 2007. 12 pages.

Redhat Comman Center. Redhat.com. http://www.redhat.com/command_center. Sep. 18, 2007. 4 pages.

Non final Office Action dated Jun. 11, 2009 for U.S. Appl. No. 11/804,702.

Final Office Action dated Nov. 17, 2009 for U.S. Appl. No. 11/804,702.

Final Office Action dated Feb. 25 2010 for U.S. Appl. No. 11/804,702.

* cited by examiner

GENERIC NETWORK PROTOCOL SCRIPTING

TECHNICAL FIELD

Embodiments of the present invention relate to network protocols, and more specifically to providing generic network protocol scripting.

BACKGROUND

In computing, one or more conventions or standards are typically adopted for governing the way machines coupled to a network communicate with each other and/or transfer data between each other. Such a convention or standard is herein referred to as a protocol. Conventionally, many protocols define rules that govern the syntax, semantics, and synchronization of communication. Protocols may be implemented by hardware, software, or a combination of the two. At the lowest level, a protocol defines the behavior of a hardware connection.

A commonly used protocol is transfer control protocol (TCP). TCP is one of the core protocols of the protocol suite used in Internet. TCP provides reliable, in-order delivery of a stream of bytes, making it suitable for applications, such as file transfer, electronic mail delivery, etc. Because of the wide usage of TCP, many TCP-based protocols have been subsequently developed, such as Post Office Protocol (POP), Secure Socket Layer (SSL), etc. To ensure these protocols work as intended, some software developers may manually emulate requests and responses between machines over a network to test different aspects of the protocols. However, this approach is tedious and time-consuming.

Another conventional ad-hoc approach involves writing a new library in a computer programming language (such as, C or Java) to implement new protocols. Again, this approach is also time consuming and error prone. If the protocol itself is being developed in tandem to protocol library (for example, when developing a new client-server communication mechanism in tandem with developing the client and/or server), it is not likely possible to validate that the protocol itself meets its intended objectives until the library is fairly substantially developed. As a result, prototyping the protocol may be slowed down.

BRIEF DESCRIPTION OF THE DRAWINGS

The present invention is illustrated by way of example, and not by way of limitation, in the figures of the accompanying drawings and in which.

DETAILED DESCRIPTION

Figure 1:
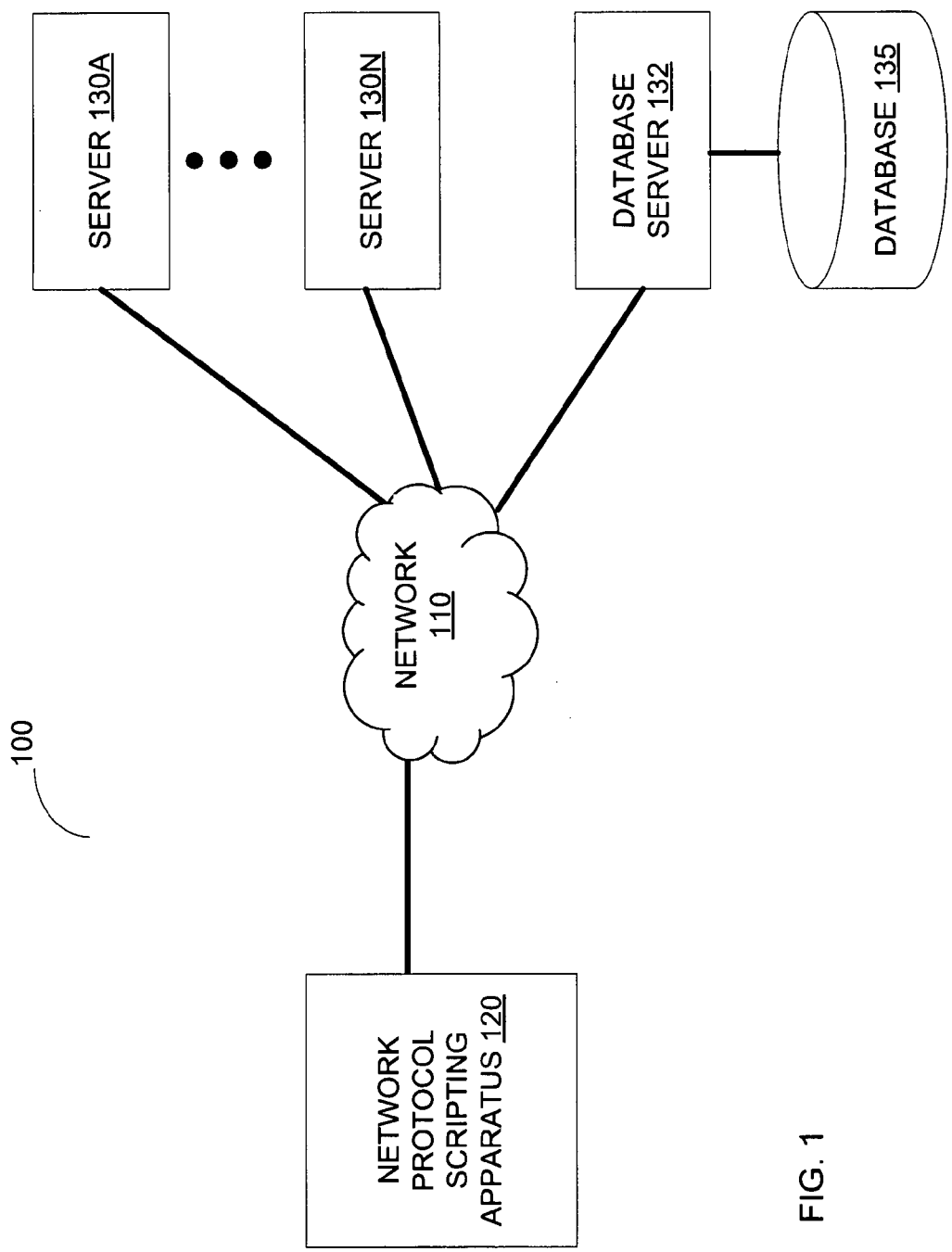
FIG. 1 illustrates one embodiment of a system in which embodiments of the present invention may be implemented.

Described herein are some embodiments of generic network protocol scripting. In one embodiment, a script is received from a user. The script is associated with a set of connection oriented network transport based network protocols. The script may be executed to emulate a network transaction according to one of the set of connection oriented network transport based network protocols within a network. The above technique creates a framework that can be scripted to emulate multiple different connection oriented network protocols (e.g., transfer control protocol based (TCP-based) network protocols, etc.). Thus, network interactions may be driven on a server using the script instead of manually emulating the network interactions over a terminal line. The above technique is useful for many different purposes, such as monitoring the network, automating testing of the network and/or the protocols, allowing rapid prototyping of the protocols, etc. More details of some embodiments of the generic network protocol scripting are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a system in which embodiments of the present invention may be implemented. The system 100 includes a network 110, a network stream protocol testing apparatus 120, a number of servers 130A-130N, a database server 132, and a database 135. The network stream protocol testing apparatus 120, the servers 130A-130N, the database server 132, and the database 135 are coupled to each other via the network 110.

Note that any or all of the components of the system 100 and associated hardware may be used in various embodiments of the present invention. However, it can be appreciated that other configurations of the system 100 may include more or fewer devices than those discussed above.

Figure 2:
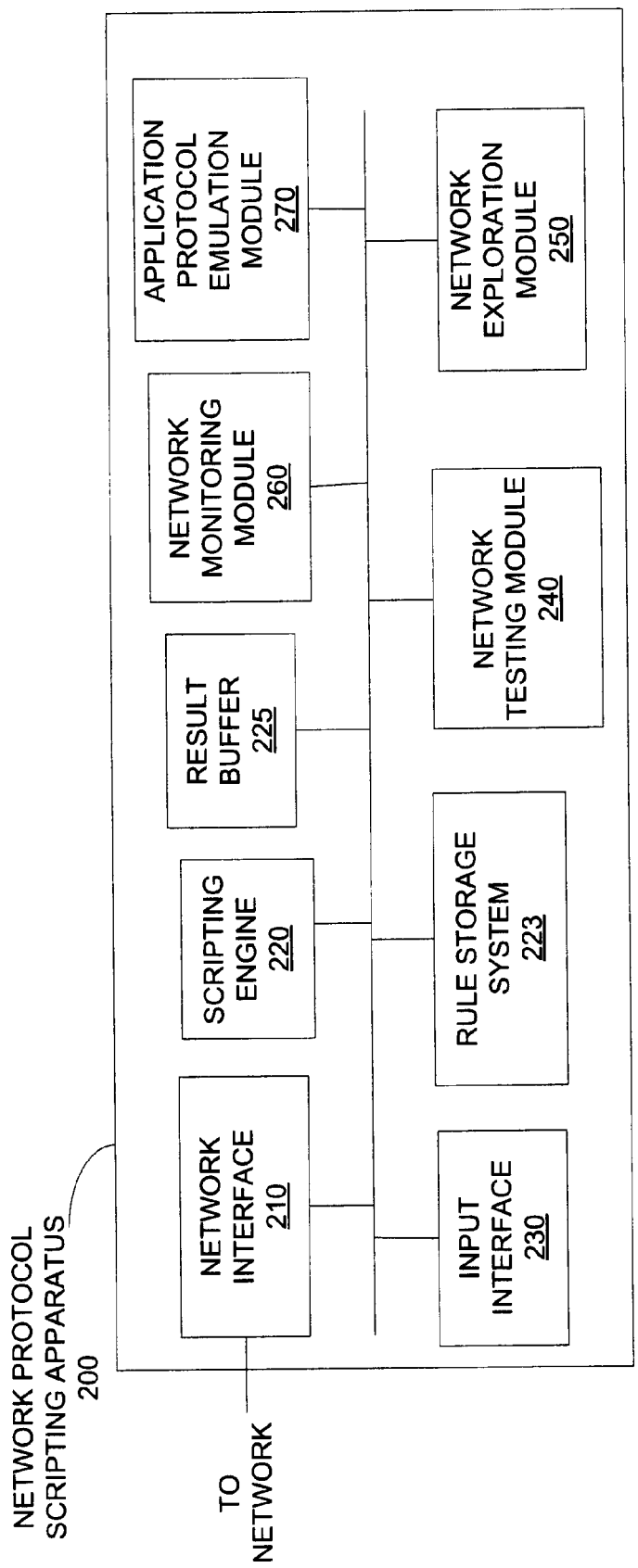
FIG. 2 illustrates a functional block diagram of one embodiment of a network protocol scripting apparatus.

The network 110 may include various types of networks, such as a local area network (LAN), a wide area network (WAN), an intranet, the Internet, etc. The network 110 may adopt connection oriented network protocol, such as a transfer control protocol (TCP) based network protocol, for transporting data over the network 110. The servers 130A-130N and the database server 132 are illustrative examples of machines communicatively coupled to the network 110. It should be apparent that other types of machines may communicatively couple to the network 110 in other embodiments, such as a computing machine, such as a desktop personal computer (PC), a laptop PC, a personal digital assistant (PDA), a mobile telephone, etc. The network stream protocol testing apparatus 120 may be implemented using a computing machine, such as the one illustrated in FIG. 4. A functional block diagram of one embodiment of the network stream protocol testing apparatus 120 is shown in FIG. 2. Some embodiments of a process to script a connection oriented network protocol using the network protocol scripting apparatus 120 are discussed below with reference to FIG. 3.

FIG. 2 illustrates a functional block diagram of one embodiment of a network protocol scripting apparatus. The network protocol scripting apparatus 200 includes a network interface 210, a scripting engine 220, a rule storage system 223, a result buffer 225, an input interface 230, a network testing module 240, a network exploration module 250, and a network monitoring module 260, an application protocol emulation module 270, which are operatively coupled to each other.

In some embodiments, the network interface 210 communicatively couples to a network, which may include an intranet, an Internet, etc. Note that the network is a connection-oriented network, such as a TCP-based network. The network may adopt protocols other than TCP, such as Transparent Inter-Process Communications (TIPC), etc. Via the network, the network interface 210 receives and sends responses and requests to machines communicatively coupled to the network, such as the servers 130A-130N and the database server 132 in FIG. 1.

In some embodiments, the input interface 230 receives a script from a user and forwards the script to the scripting engine 220. The scripting engine 220 executes the script to emulate a network transaction within the network. For instance, the script, when executed by the scripting engine 220, may cause the network protocol scripting apparatus 200 to send a response to the network as if the network protocol scripting apparatus 200 has received a corresponding request. Alternatively, executing the script may cause the network interface 210 to connect to a host over the network, to send a protocol string to the host, and to wait for a response from the host. The scripting engine 220 may match the response, if received, against a set of predefined strings in the rule storage system 223 in order to test the network. In another embodiment, executing the script may cause the network interface 210 to make a TCP-connection to an arbitrary socket, to send a protocol string via the socket, and to close the TCP-connection when a predetermined time period expires. Results from executing the script may be stored in the result buffer 225. Details of some embodiments of the process to script the network protocol are discussed below with reference to FIG. 3.

In some embodiments, the network testing module 240 causes the scripting engine 220 to repeat execution of the script in order to test the network. Alternatively, the network exploration module 250 analyzes the TCP-based network protocol by examining results of executing the script. In some embodiments, the network monitoring module 260 monitors the network by causing the scripting engine to periodically execute the script, and reviewing results of periodic execution of the script. In some embodiments, the application protocol emulation module 270 emulates a particular network application protocol (e.g., HTTP, FTP, etc.) by causing the scripting engine 220 to load a set of scripts from rules storage system 223, and then causing the scripting engine 220 to execute one or more of these scripts in a sequence it controls.

Figure 3:
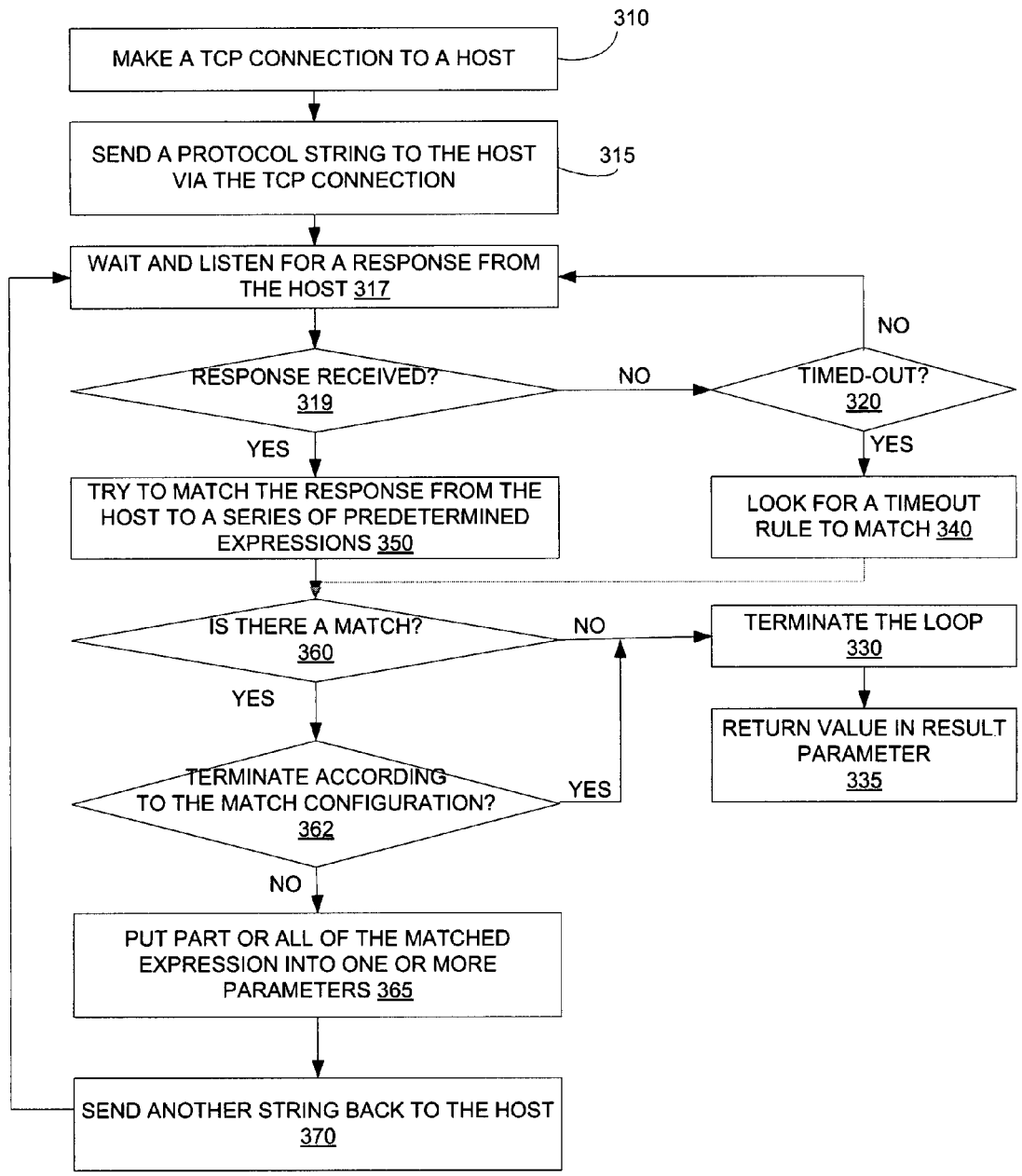
FIG. 3 illustrates a flow diagram of one embodiment of a process to test a network protocol.

FIG. 3 illustrates a flow diagram of one embodiment of a process to test a network protocol. The process may be performed by processing logic that may comprise hardware (e.g., circuitry, dedicated logic, programmable logic, microcode, etc.), software (such as instructions run on a processing device), firmware, or a combination thereof. For example, the network protocol scripting apparatus 200 in FIG. 2 may perform at least part of the process in some embodiments.

To create a framework that can be scripted to emulate multiple different TCP-based protocols, processing logic at the network stream protocol testing apparatus first makes a TCP connection to a host using the appropriate internet protocol (IP) address and port (processing block 310). This may or may not require binding the local end of the connection to a specific port first. Then processing logic may send a protocol string to the host via the TCP connection (processing block 315). This string may be a literal string value, or it may have various parameters put into it, where the parameters are likely to be easily parsed stylized strings. For example, the string may start with two percent characters, followed by one or more upper case letters, followed by two percent characters. For example, to simulate a request for configuration information through a web service, the string to be sent may be:
GET/config?node=%%NODEID%%HTTP/1.0
Host: %%HOSTNAME%%

After sending the string, processing logic may iterate the following operations in a loop until it runs out of configuration. In some embodiments, processing logic waits and listens for a response from the host (processing block 317). Processing logic checks whether a response has been received (processing block 319). The length of the expected response from the host is configured either as a literal value, a parameter, zero (which means listening until the other side stops sending) or a negative number (which means listening for that many lines from the other side).

If processing logic determines that no response has been received yet, processing logic checks if it is timed out (processing block 320). If it has not timed out yet, then processing logic returns to processing block 317 to wait for a response. Otherwise, if it has timed out, then processing logic looks for a timeout rule to match (processing block 340). Then processing logic determines if there is a match (processing block 360). In some embodiments, the timeout may be treated as a match of the timeout rule to simplify implementation because there is only one exit out of the loop from the rule. Further, by capturing control at a timeout, this scripting approach may be used with unreliable connection oriented protocols (e.g., frame relay, SCTP in certain modes, etc.). Moreover, processing logic may readily insert delay by constructing a ruleset that has a zero-length protocol string, a timeout equal to the delay desired to achieve, and a timeout match rule that allows processing logic to transition to the next ruleset to use.

In some embodiments, if processing logic determines that a response from the host has been received at processing block 319, then processing logic may try to match the response from the host against a series of predetermined strings or expressions (processing block 350). Each of the strings or expressions comprises one or more alphanumeric characters and special characters (e.g., "%," "?," etc.). The strings or expressions may be specified directly in the configuration (with or without parameters), or the string may be from running a subroutine. Furthermore, the match rule may set a parameter to a specific value, or to the value of another parameter. The match configuration may specify continuing to try to match, or to return to processing block 317 to wait and listen for a response, with or without changing to another match configuration, or terminate the loop entirely.

If there is no match, then processing logic transitions from processing block 360 to processing block 330 to terminate the loop in some embodiments. Furthermore, processing logic may return a value in result parameter (processing block 335). Since the loop is terminated due to a lack of matching expression, the value returned in the result parameter would indicate a failure. Otherwise, if there is a match, then processing logic transitions from processing block 360 to processing block 362. Processing logic determines if the loop may be terminated according to the configuration corresponding to the matched expression (processing block 362). If the loop may be terminated, then processing logic terminates the loop (processing block 330) and returns a value in result parameter (processing block 335). Note that it is possible that the script succeeded without a matching rule, or failed with a matching rule. In some embodiments, the default value in the result parameter is a success, in which case, the default may be made explicit.

In some embodiments, if the loop may not be terminated yet, processing logic may put part or all of the matched expression into one or more parameters (processing block 365). Processing logic may further send another string back to the host (processing block 370) and then transition back to processing block 317 to repeat the above operations.

In some embodiments, there is a default rule for the case in which the response from the server end does not match anything. The set of predetermined expressions to match may include an explicit default rule, in which case it may do anything that a normal match could do, such as setting parameters for what is matched. For example, a default rule may set all parameters to be an empty string. If there is no explicit default rule, the loop may be terminated.

To further illustrate the above process, a more detailed example is discussed below. In the following example, the remote host has a hostname in the parameter, HOSTNAME, and a required node parameter is stored in NODEID. A successful configuration response may match the regular expression "Node #(\d+) configuration." To set up the configuration, processing logic sends the following string immediately after connecting:
GET/config?node=%%NODEID%%HTTP/1.0\r\nHost: %%HOSTNAME%%\r\n\r\n Note that the above expression is in one line, with carriage returns and new-lines represented as backslash escapes. Further, %%NODEID%% and %%HOSTNAME%% are parameters, and the appropriate values are substituted in before the string is sent across the connection. For example, suppose NODEID is 8675 and HOSTNAME is example.host.com, then the string sent across the connection is:
GET/config?node=8675 HTTP/1.0
Host: example.host.com The lines above end with the network line termination string (which is a carriage return and linefeed character pair), and there would be a blank line after the last line in this example.

The first listening configuration has a length parameter of −1, i.e., to listen for one line, and the following regular expression:
^200
Send nothing, change to the next configuration, and restart the loop.

Note that there is no need for an explicit default rule in the current example because the process may abort if a 200 status code is not received.

The second listening configuration has a length parameter of −1, i.e., to listen for one line, and the following regular expression:
^$
Send nothing, change to the next configuration, and restart the loop
^Content-Length: (\d+)
Capture what was matched by "(\d+)" (which is a string of digits) into the parameter BODYLENGTH, send nothing, restart the loop
There would be an explicit default action set of "send nothing, restart the loop" in the current configuration.

The next configuration gets its length from the parameter BODYLENGTH, which has been initially set to zero, so this may still work even if the other end does not send a Content-Length: header. The matches are:
Node #(\d+) configuration
Capture what was matched by "(\d+)" into the parameter RESULT, send nothing, and continue
There would be no explicit default rule in this rule. The "and continue" would effectively terminate the loop at this point, whether the returned value from the server matched or not.

Alternatively, the above approach may be used to model more complex protocols, such as Post Office Protocol version 3 (POP3), Secure Shell (SSH) command line interface, Secure Socket Layer (SSL), etc. In some embodiments, processing logic may need to wait for and check the server banner that is sent on connection, and then processing logic may send a username and password information separately.

One should appreciate that the above examples are provided to illustrate the concept, but not to limit the scope of the appended claims. Variations from the above examples are possible in different embodiments. Furthermore, the technique disclosed herein may be applicable to test other types of protocols, such as data link layer protocols (e.g., frame relay, asynchronous transfer mode (ATM), etc.).

In some embodiments, the above scripting technique is used in rapid protocol prototype development. Being able to script the protocol interaction allows rapid prototyping of a network protocol, and the script may be used to evaluate if a particular protocol is suitable for some predetermined purposes.

Figure 4:
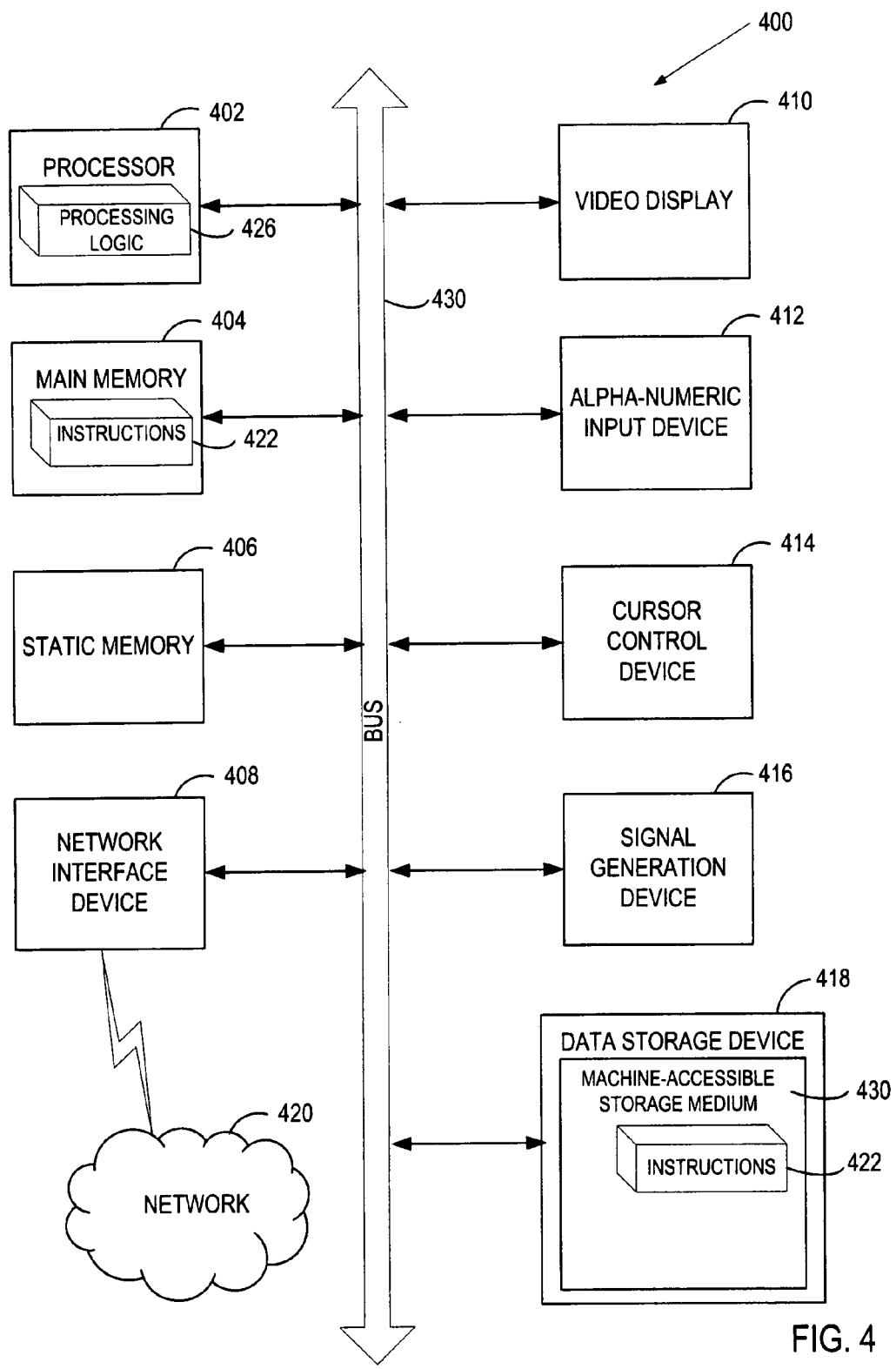
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of generic network protocol scripting have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving a script associated with a connection oriented network transport based network protocol by a scripting engine from a user; and
   executing the script by the scripting engine executed by a computer to emulate a network transaction over the connection oriented network transport based network protocol within a network, executing the script including making a connection to a host and sending a protocol string defined by the script to the host via the connection, the protocol string comprising a literal value and a parameter retrieved from an associated configuration that defines a protocol specific command to be tested;
   waiting for a response from the host; and
   matching the response against a plurality of predefined strings stored in a rules storage system after receiving the response.

2. The method of claim 1, wherein the connection oriented network transport based network protocol comprises one or more transfer control protocol-based (TCP-based) network protocols.

3. The method of claim 1, wherein executing the script comprises:
   making a connection to an arbitrary socket;
   sending a protocol string via the arbitrary socket; and
   closing the connection when a predetermined time period expires.

4. The method of claim 1, further comprising:
   repeating execution of the script to test the network.

5. The method of claim 1, further comprising:
   examining results of executing the script to analyze the connection oriented network transport based network protocol.

6. The method of claim 1, further comprising:
   monitoring the network by periodically executing the script and reviewing results of periodic execution of the script.

7. An apparatus comprising:
   a scripting engine to execute a script associated with a connection oriented network transport based network protocol to emulate a network transaction according to the connection oriented network transport based network protocol within a network including making a connection to a host and sending a protocol string defined by the script to the host via the connection, to wait for a response from the host, to match the response against a plurality of predefined strings stored in a rules storage system, the protocol string comprising a literal value and a parameter retrieved from an associated configuration that defines a protocol specific command to be tested; and a network interface coupled to the scripting engine, to communicatively couple to the network.

8. The apparatus of claim 7, wherein the connection oriented network transport based network protocol comprises one or more transfer control protocol-based (TCP-based) network protocols.

9. The apparatus of claim 7, further comprising:
an input interface coupled to the scripting engine, to receive the script from a user.

10. The apparatus of claim 7, wherein executing the script causes the network interface to make a connection to an arbitrary socket, to send a protocol string via the socket, and to close the connection when a predetermined time period expires.

11. The apparatus of claim 7, further comprising:
a network testing module coupled to the scripting engine, to cause the scripting engine to repeat execution of the script to test the network.

12. The apparatus of claim 7, further comprising:
a network exploration module coupled to the scripting engine, to analyze the connection oriented network transport based network protocol based on result of executing the script.

13. The apparatus of claim 7, further comprising:
a network monitoring module coupled to the scripting engine, to monitor the network by causing the scripting engine to periodically execute the script, wherein the network monitoring module is further operable to review results of periodic execution of the script.

14. A system comprising the apparatus of claim 7, further comprising:
the network; and
a server, wherein the scripting engine is operable to execute the script to cause the network interface to connect to the server over the network.

15. A non-transitory machine-readable medium that provides instructions that, when executed by a processor, will cause the processor to perform operations comprising:
receiving a script associated with a connection oriented network transport based network protocol by a scripting engine from a user; and
executing the script by the scripting engine to emulate a network transaction over the connection oriented network transport based network protocol within a network, executing the script including making a connection to a host and sending a protocol string defined by the script to the host via the connection, the protocol string comprising a literal value and a parameter retrieved from an associated configuration that defines a protocol specific command to be tested,
waiting for a response from the host; and
matching the response against a plurality of predefined strings stored in a rules storage system after receiving the response.

16. The non-transitory machine-readable medium of claim 15, wherein the connection oriented network transport based network protocol comprises one or more transfer control protocol-based (TCP-based) network protocols.

17. The non-transitory machine-readable medium of claim 15, wherein executing the script comprises:
making a connection to an arbitrary socket;
sending a protocol string via the arbitrary socket; and
closing the connection when a predetermined time period expires.

18. The non-transitory machine-readable medium of claim 15, wherein the operations further comprise:
repeating execution of the script to test the network.

19. The non-transitory machine-readable medium of claim 15, wherein the operations further comprise:
examining results of executing the script to analyze the connection oriented network transport based network protocol.

20. The non-transitory machine-readable medium of claim 15, wherein the operations further comprise:
monitoring the network by periodically executing the script and reviewing results of periodic execution of the script.

* * * * *